May 14, 1968  J. W. PINKERTON  3,382,814
PISTON HOLDDOWN MEANS
Filed May 23, 1966
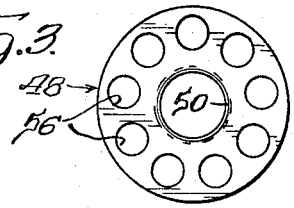
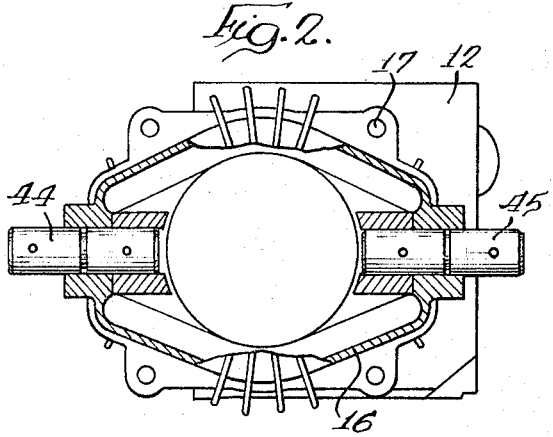
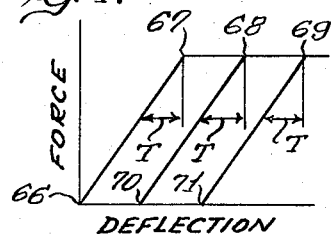
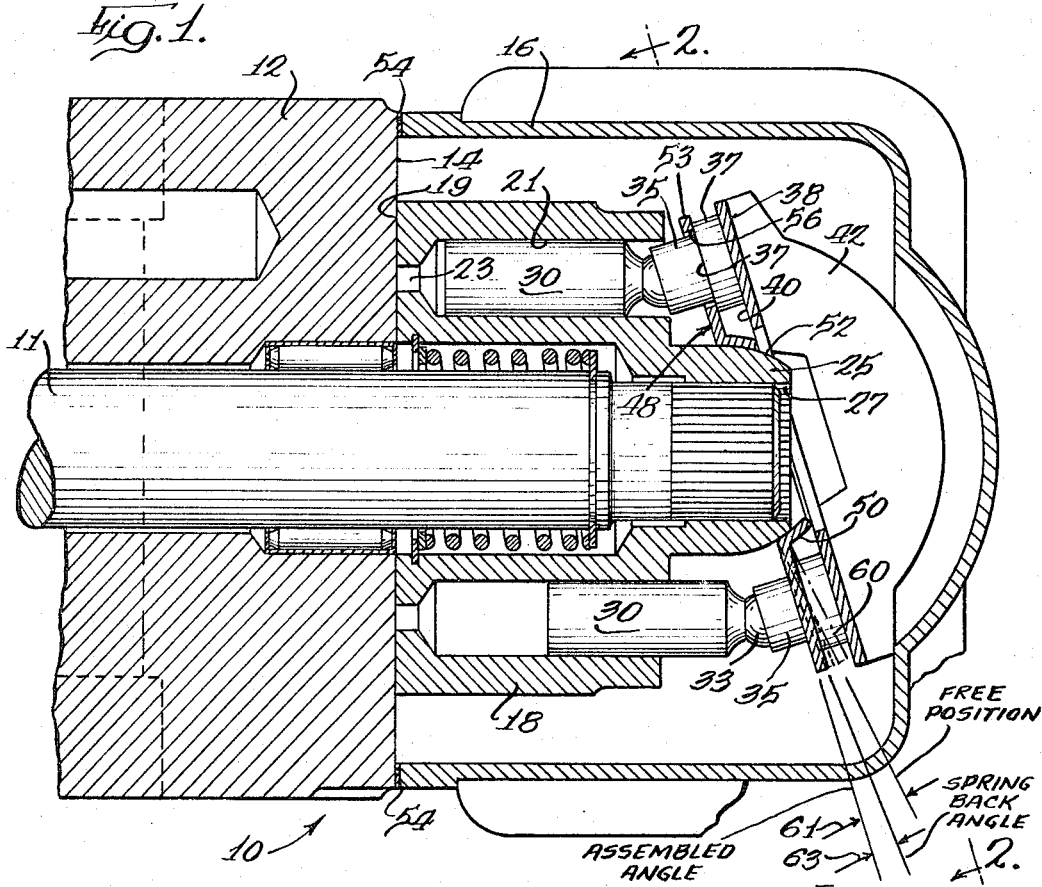
Inventor:
John W. Pinkerton
By Hofgren, Wegner,
Allen, Stellman & McCord
Attys 3,382,814
PISTON HOLDDOWN MEANS
John W. Pinkerton, La Salle, Ill., assignor to Sundstrand Corporation, a corporation of Illinois
Filed May 23, 1966, Ser. No. 552,044
12 Claims. (Cl. 103—162)

ABSTRACT OF THE DISCLOSURE

A piston return mechanism for an axial piston hydraulic unit including a plate type spring which has been stressed beyond its proportion limit during assembly of the unit and then relaxed a certain amount so that the spring back or piston return force of the plate is predetermined regardless of tolerance variations from one unit to another.

---

This invention relates generally to hydraulic fluid energy translating devices of the reciprocating piston type and more particularly to a piston holddown mechanism for maintaining a force transmitting contact between members in such devices and a method of assembling the same.

Hydraulic units of the axial piston type are well known in the art and are conventionally usable as either pumps or motors. These devices consist of a drive shaft having a torque transmitting relationship with a rotatable cylinder block which has cylinders formed therein generally parallel to the axis of rotation of the cylinder block. This type of unit is commonly referred to as an axial piston unit. Pistons are reciprocable in the cylinders and have slippers or bearing means on the ends thereof in engagement with an inclined camming member which transmits force to the pistons to cause reciprocation thereof within the cylinders as the cylinder block rotates relative to the camming member. One end of the cylinder block engages a valve member having inlet and outlet ports which serially communicate with the cylinders as the block rotates and in this manner fluid is received and expelled from the unit.

In axial piston units of this general character it is desirable to maintain a holddown force on the bearing slippers, insuring contact between the bearing slippers and the inclined camming member, assisting piston return and resisting centrifugal forces tending to throw the slippers out. In the past it has been proposed that various types of springs be provided between the cylinder block and the piston slippers for the purpose of providing the holddown force. In the manufacture of hydraulic units of this type there must of necessity be manufacturing tolerances for the various parts that make up the unit, that is, tolerance ranges within which a particular part dimension may vary and still be acceptable. As a result of this, there may occur during manufacture a tolerance buildup situation where various tolerances do not cancel each other but build up to produce a significant variation in the axial distance between the cylinder block and the cam member. When a conventional piston return or holddown means, such as a spring device, is interposed between the cylinder block or another part of the unit, and the bearing slippers, the tolerance buildup may result in the piston return springs being nonuniformly compressed in successive units. The result of this is that the force transmitted to the slippers or bearings for urging them against the cam member varies significantly from unit to unit depending upon tolerance buildup, whereas it is preferable to provide a constant force because excessive force causes excessive wear and insufficient force may not hold the slippers down. At it is desirable to maintain the resilient piston holddown force substantially constant at a predetermined desired value in all manufactured units of this type, the present invention has been devised to overcome the prior art problems.

In accordance with the present invention, a resilient piston holddown means is provided which maintains a constant piston holddown force even though there may be a tolerance buildup in the parts from which the hydraulic units are constructed. Toward this end, an annular resilient piston return plate of frusto-conical configuration has been devised having a sufficient axial length so that during assembly of the unit the plate may be permanently deformed above the proportional limit of the material from which the plate is constructed. After yielding, the piston return or retainer plate retains a springback force which serves to hold the slippers against the thrust plate. This springback force is substantially constant due in part to the fact that the material from which the plate is constructed has a constant force-deflection ratio below its proportional limit (yield limit).

It is therefore a primary object of the present invention to provide a new and improved piston return mechanism for a hydraulic unit of the type described.

Another object of the present invention is to provide a simple, inexpensive piston return mechanism that will produce substantially the same piston return force in axial piston hydraulic units even though there be a tolerance buildup in the units.

A more specific object of the present invention is to provide a new and improved axial piston hydraulic unit of the type described above with a resilient piston return plate having a generally spherical portion seated on a spherical reaction member, the plate also having a generally frusto-conical portion extending from the spherical portion and having apertures for receiving the piston slippers, the plate being constructed of a metal having a substantially constant force versus deflection ratio below the proportional limit so that the springback force of the plate on the slippers is substantially constant even with tolerance buildup in the unit.

A still further object of the present invention is to provide a new and improved method of assembling an axial piston hydraulic unit with a resilient piston return plate so that the piston return plate maintains a substantially constant force on the piston slippers even though there be a tolerance variation in the hydraulic units in which the piston return plates are incorporated.

Other objects and advantages will be readily apparent from the following detailed description made in connection with the accompanying drawing in which:

FIG. 1 is a longitudinal section taken through an axial piston hydraulic unit incorporating a piston return mechanism embodying the present invention;

FIG. 2 is a cross section taken at about line 2—2 of FIG. 1, with parts omitted;

FIG. 3 is an elevation, reduced in size, of the retainer plate shown in FIG. 1; and FIG. 4 is a load versus deflection curve for the present piston return plate in a typical installation.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring in more detail to the drawing, an axial piston hydraulic unit 10 is seen to consist generally of a drive shaft 11 rotatably supported in a valve block 12. The block 12 has arcuate inlet and outlet ports (not shown) which open to the valve block face 14. A housing member 16 is suitably fixed to the valve block 12 and encloses a rotatable cylinder block 18 having a flat face 19 slidably engaging the valve block face 14. The housing member and valve plate may be secured together as by bolts in apertures 17 of housing suitably engaged with the valve block.

The cylinder block 18 has a plurality of axially disposed cylinders 21 formed therein in annular array about the axis of rotation of the cylinder block 18 and drive shaft 11. Each cylinder 21 communicates with the cylinder block face 19 through cylinder ports 23. The arcuate inlet and outlet ports in the valve block 12 are positioned so that the cylinder ports 23 will serially communicate therewith as the cylinder block rotates.

A rearwardly extending annular projection 25 is formed on the end of the cylinder block 18 and has internal splines 27 which interengage mating splines on the cantilevered end of drive shaft 11. This provides the torque transmitting relationship between the cylinder block and the drive shaft.

Pistons 30 slidably disposed in the cylinders 21 have spherical ends 33 projecting from the cylinder block and received in complementary spherical sockets in slippers 35. Each slipper has an annular flanged portion 37 with a bearing surface 38 slidably engaging a camming surface 40 on a cam member 42 which serves to reciprocate the pistons 30 in the cylinders as the cylinder block 18 rotates.

As shown more clearly in FIG. 2, the cam member 42 is pivotally mounted in the housing 16 by transversely extending trunnions 44 and 45. A suitable control lever may be connected to one of the trunnion 44 or 45 to vary the angular position of cam member 42 and thus adjust the displacement of the hydraulic unit 10 as desired.

When the device is operating as a pump, the input shaft 11 is connected to a suitable prime mover and drives the cylinder block 18 in rotation. The interengagement of the slippers 35 with the cam surface 40 causes the pistons 30 to move to the left in the cylinders 21 as shown in FIG. 1, expelling high pressure fluid through ports 23 into the outlet pressure port in valve block 12 which then operates as a high pressure port. As the pistons begin their retraction stroke under the influence of the piston return mechanism described below, fluid is drawn into the cylinders from the low pressure port inlet in the valve block 12. As will be clear to those skilled in the art, devices of this character may be used as a motor rather than a pump by delivering high pressure fluid to the cylinders 21 causing the cylinder block 18 to rotate, driving the shaft 11 which is then an output shaft.

A resilient biasing mechanism is provided according to the present invention for maintaining sliding engagement between the slippers 35 and the camming surface 40. Toward this end a resilient, generally annular, retainer plate 48 is provided. This plate has a central frustospherical portion 50 slidably engaging a spherical surface 52 on the cylinder block projection 25 which permits pivotal movement of the retainer plate 48 on pivotal adjustment of the cam member 42. Extending outwardly from the spherical portion 50 is a frusto-conical portion 53 which engages the shoulders 37 on the slippers and resiliently urges the slippers into engagement with the camming face 40. An annular array of apertures 56 in the frusto-conical portion 53 loosely receive the reduced portions of slippers 35.

An important aspect of the present invention is that the retainer plate 48 is made of an appropriate size, constructed of a suitable material and deformable during assembly in a manner such that it is capable of applying a substantially constant force on the shoulders 37 even though the actual distance between the center of the spherical surface 52 and the plane of the shoulders 37 may vary from one unit to another.

More specifically, the hydraulic unit is preassembled with all the parts in place, except that a shim or gasket 54 is not positioned between the valve block 12 and the housing member 16. In such condition, the valve block and the housing member are fixed against each other in a manner that may permanently deform the retainer plate 48. Thereafter, the parts are disassembled sufficiently to insert the shim or gasket 54, and thereupon reassembled.

The plate 48 is constructed of a material such as low carbon steel which is capable of deformation beyond its proportional limit or yield limit while still retaining the capacity for resilient yieldability upon removal of the yield force and application of force less than the force required to yield the material, that is, permanently deform it.

Preferably, the plate 48 is made of material such as low carbon steel which has a substantially constant force versus deflection ratio below its proportional limit as shown in the curves of FIG. 4. AISI 1010 steel has been found particularly useful for the purpose. Further, the plate 48 has a sufficient initial axial length when relaxed so that it may be compressed during preassembly of the unit and deformed beyond the yield limit of the material from which the plate is constructed. However, the force required to permanently deform the retainer is greater than the internal force in the hydraulic unit during operation. Thus, if the retainer is yielded during preassembly, the preassembly yield force may be removed in a manner such that the retainer will relax and thereafter may have a lesser preload applied in final assembly to maintain constant holddown force in all units.

Approximate dimensions for one successful retainer plate are as follows: AISI 1010 steel #18 gauge, diameter 2.64 in., slipper holes 56 0.562 in. on a basic diameter of 1.908 in., diameter of curvature of spherical portion 50 .127 in., axial length of conical portion (relaxed) 0.156 in.

As shown in FIG. 1 by the dotted lines indicated at 60, the plate 48, and more specifically the outer conical portion 53 thereof, when relaxed or in its free position tends to interfere considerably with the slipper shoulders 37. The angle of interference is designated 61 and is selected so that if the plate is compressed during preassembly from the position shown at 60 beyond the position shown in solid lines (with the shim 54 removed), the material of the plate 48 will yield above the proportional limit of the material but will maintain a springback force against the shoulders 37 to resiliently urge the slippers into engagement with the face 40.

When the unit is reassembled with the shim 54, the retainer is flattened into the assembled position shown in solid lines in FIG. 1. The amount the retainer yields during preassembly without the shim 54 depends on the combined tolerances of the parts making up the total assembly. However, after yielding, the retainer plate 48 will retain a springback force against the slippers 35 which is substantially constant throughout the normal tolerance range of parts conventionally made for units of this type if shims 54 of constant thickness are employed. Since the springback force of the plate 48 is dependent upon the stress-strain curve of the material from which it is constructed, and since the material has a substantially constant curve below the proportional limit, the springback force or the piston return force is substantially constant for these units throughout the tolerance range. This springback angle is indicated at 63.

In other words, while the angle of interference 61 may vary from unit to unit due to tolerance buildup, the springback angle 63 will remain substantially the same for all units and thus the piston return force exerted by the plate 48 on the slippers 35 will be substantially constant.

As noted above, low carbon steels such as AISI 1010 are suitable for the construction of the retainer plate 48. For such steels the slope of the force versus deflection curve approaches zero after the proportional limit. As the present device is constructed so that it may yield the plate above the proportional limit during assembly, the springback force exerted by such a plate will be constant even though the plate is initially deflected or yielded during assembly an amount depending upon tolerance buildup. It is only necessary that the plate have a sufficient axial length so that it may be compressed or flattened to or above the proportional limit for all parts within the normal tolerance range.

In FIG. 4, a load versus deflection curve is shown for the retainer plate 48. During preassembly, the housing 16 carrying the cam 42 is forced against the valve plate 12 without the shim 54 in position, deflecting the retainer 48 from a position represented at 66 toward a position represented at 67, indicative of the yield point of the material at which the latter may be permanently deformed. If the preassembly force applied is continued, there is a permanent deformation of the retainer toward the position 68. If the preassembly force is continued further, deformation continues toward position 69. The amount the retainer yields is a function of the tolerance buildup of the parts comprising the total hydraulic unit. If the preassembly force is insufficient to deform the retainer beyond the point 67, then upon removal of the preassembly force, the retainer returns along the line 67–66 to the position 66. If the retainer is deformed with some permanent yield to the position 68, upon removal of the preassembly force the retainer returns along the line 67–66 to the position If the preassembly deformation concludes at 69, upon disassembly the retainer returns to a position 71 along the line 69–71.

The shape of the retainer is such that after removal of the preassembly force and return of the retainer to a relaxed condition, there will always be an appropriate disposition of the frusto-conical portion to impose a predetermined biasing piston holddown force upon reassembly of the apparatus with the shim 54 in position. Now, whenever the unit is reassembled, resilient deformation of the retainer during assembly proceeds from a relaxed state at 66, 70 or 71 (or some other similar position) along one of the lines 66–67, 70–68, and 71–69, all of which indicate similar substantially constant force-deflection ratios throughout the length. Upon reassembly, since the total deflection of the retainer is always limited by a shim of constant thickness represented at T, the retainer will be compressed during reassembly to always apply substantially the same force determined by the thickness of the shim and not the tolerance buildup in the unit.

It will be appreciated that if the yield point of the retainer for permanent deformation is at a force level comparable to that required for piston holddown, it may be possible to operate the hydraulic unit without disassembly and reassembly with the shim 54. However, in the event of development of forces in the unit in excess of those normally required for holddown, there may result an additional permanent deformation of the retainer rather than a resilient holding of the bearing slippers against the cam. Normally, it is preferable that the yield point for permanent deformation of the retainer be higher than that required for piston holddown so that the unit may be disassembled for insertion of the shim, thereby establishing a holddown force at a lower value than the permanent deformation point, leaving a safety margin for conditions where more than normal piston holddown force may be necessary.

I claim:

1. A multiple piston hydraulic unit of parts comprising, a valve member having inlet and outlet ports therein, a rotatable cylinder block having a portion thereof slidably engaging said valve member and having a plurality of cylinders therein serially communicable with said inlet and outlet ports, pistons slidable in said cylinders and having bearing means on the ends thereof extending from the cylinders, a cam member for reciprocating said pistons, and resilient means acting against the bearing means and reacting against another part in the unit for continuously urging said bearing means into engagement with said cam member including a resilient member, said part in the unit having an unpredetermined spacing from said bearing means, said resilient member being permanently deformed sufficiently and released a predetermined amount to provide a predetermined springback force.

2. A combination as defined in claim 1, wherein said resilient member comprises a generally annular plate constructed of a material capable of predetermined resilient deformation and springback without permanent deformation and capable of variable permanent deformation while retaining the capacity for predetermined springback.

3. A combination as defined in claim 2 including a housing around the cylinder block and cam member fixed with respect to the valve member, a shaft rotatable in the housing with the cylinder block, a reaction member on the shaft engaging the resilient means, means mounting the cam member in the housing, and a shim spacing the housing from the valve member by a predetermined amount, said parts being capable of preassembly without the shim to initially deform the plate an amount sufficient to account for tolerance buildup in the parts, and capable thereafter of disassembly and reassembly with the shim in place to establish a predetermined piston holddown force on said bearing means.

4. A combination as defined in claim 3 wherein said reaction member is generally spherically shaped, and said plate comprises a central annular portion engaging the reaction member and an outwardly extending generally frusto-conical portion engaging said bearing means.

5. A combination as defined in claim 4, wherein said central annular portion is generally spherically shaped and said frusto-conical portion has openings respectively for receiving said bearing means.

6. A combination as defined in claim 4 wherein said reaction member is fixed with respect to the cylinder block.

7. A combination as defined in claim 2 wherein said material has a substantially constant force-to-deflection ratio throughout the range of resilience before and after permanent deformation.

8. A combination as defined in claim 3 wherein said material has a substantially constant force-to-deflection ratio throughout the range of resilience before and after permanent deformation, so that regardless of whether the plate is permanently deformed or not during preassembly, upon the insertion of a shim of predetermined thickness during reassembly, the plate will always exert a predetermined holddown force.

9. In a method of assembling a hydraulic unit having parts including a valve member with inlet and outlet ports therein, a housing fixed to the valve member, a rotatable cylinder block having a portion thereof slidably engaging said valve member, said cylinder block having a plurality of cylinders therein each serially communicable with said inlet and outlet ports, pistons slidable in said cylinders and having bearing means on the ends thereof extending from said cylinders, a cam member in the housing for reciprocating said pistons in the cylinders, and a spherical reaction member adjacent said cylinder block, the steps comprising, placing a resilient plate between the spherical reaction member and the bearing means constructed of a material capable of resilient and permanent deformation while retaining a predetermined springback force, assembling said parts to permanently deform said plate sufficiently to account for tolerance buildup in the parts, disassembling and reassembling the parts with a spacing means to increase the axial distance between the spherical member and the cam member an amount to establish a predetermined and continuous biasing force on the bearing means by the resilient plate.

10. The method defined in claim 9, wherein a shim is placed between the valve member and the housing during reassembly, the thickness of which determines the holddown force exerted by the resilient plate.

11. A multiple piston hydraulic unit of parts comprising, a valve member having inlet and outlet ports therein, a rotatable cylinder block having a portion thereof slidably engaging said valve member and having a plurality of cylinders therein serially communicable with said inlet and outlet ports, pistons slidable in said cylinders and having bearing means on the ends thereof extending from the cylinders, a cam member for reciprocating said pistons, and resilient means acting against the bearing means and reacting against another part in the unit for continuously urging said bearing means into engagement with said cam member including a resilient member constructed of a material capable of permanent deformation during assembly while retaining a predetermined springback force, said resilient member comprising a generally anular plate of low carbon steel material.

12. In a method of assembling a hydraulic unit having parts including a valve member with inlet and outlet ports therein, a housing fixed to the valve member, a rotatable cylinder block having a portion thereof slidably engaging said valve member, said cylinder block having a plurality of cylinders therein each serially communicable with said inlet and outlet ports, pistons slidable in said cylinders and having bearing means on the ends thereof extending from said cylinders, a cam member in the housing for reciprocating said pistons in the cylinders, and a spherical reaction member adjacent said cylinder block, the steps comprising, placing a resilient member between the spherical reaction member and the bearing means constructed of a material capable of resilient and permanent deformation while retaining a predetermined springback force, assembling said parts to permanently deform said plate sufficiently to account for tolerance buildup in the parts, and separating said cam member from said cylinder block a predetermined distance after said permanent deformation, said predetermined distance being sufficiently small so that the resilient member exerts a continuous biasing force on said bearing means.

References Cited

UNITED STATES PATENTS

| | | | |
|---|---|---|---|
| 1,710,567 | 4/1929 | Carey | 103—162 |
| 2,709,339 | 5/1955 | Edelman et al. | 103—162 X |
| 2,776,627 | 1/1957 | Keel | 103—162 |
| 3,191,543 | 1/1965 | Hann et al. | 103—162 |
| 3,207,082 | 9/1965 | Budzich et al. | 103—162 |
| 3,304,885 | 2/1967 | Orth | 103—162 |

DONLEY J. STOCKING, *Primary Examiner.*

WILLIAM L. FREEH, *Examiner.*

UNITED STATES PATENT OFFICE
CERTIFICATE OF CORRECTION

Patent No. 3,382,814　　　　　　　　　　　　　May 14, 1968

John W. Pinkerton

It is certified that error appears in the above identified patent and that said Letters Patent are hereby corrected as shown below:

In the heading to the printed specification, line 4, "Illinois" should read -- Delaware --.

Signed and sealed this 10th day of March 1970.

SEAL)

Attest:

Edward M. Fletcher, Jr.　　　　　　　　WILLIAM E. SCHUYLER, JR.
Attesting Officer　　　　　　　　　　　　Commissioner of Patents